（12) United States Patent
Shahin, Jr. et al.

(10) Patent No.: US 6,279,392 B1
(45) Date of Patent: Aug. 28, 2001

(54) METHOD AND SYSTEM FOR DISTRIBUTED WELL MONITORING

(75) Inventors: Gordon Thomas Shahin, Jr., Bellaire; Harold J. Vinegar, Houston, both of TX (US)

(73) Assignee: Snell Oil Company, Houston, TX (US)

( * ) Notice: Subject to any disclaimer, the term of this patent is extended or adjusted under 35 U.S.C. 154(b) by 0 days.

(21) Appl. No.: 09/440,858

(22) Filed: Nov. 16, 1999

Related U.S. Application Data

(63) Continuation of application No. 08/826,117, filed on Mar. 27, 1997, now abandoned.
(60) Provisional application No. 60/014,359, filed on Mar. 28, 1996.

(51) Int. Cl.$^7$ .............. E21B 47/00; E21B 49/00; G01V 3/26
(52) U.S. Cl. .................. 73/152.52; 73/152.17; 73/152.57; 166/250.14; 166/285; 175/50
(58) Field of Search .............. 73/152.52, 152.51, 73/152.17, 152.57; 166/250.14, 242.9, 285; 175/50

(56) References Cited

U.S. PATENT DOCUMENTS

| | | | |
|---|---|---|---|
| 2,708,000 | 5/1955 | Zandmer | 166/100 |
| 2,786,531 | 3/1957 | Mangold et al. | 166/12 |
| 2,977,792 | * 4/1961 | Simm | 73/155 |
| 3,489,219 | 1/1970 | Higgins | 166/253 |
| 3,752,257 | * 8/1973 | Davis | 181/0.5 AG |
| 4,191,250 | * 3/1980 | Messenger | 166/253.1 |
| 4,440,226 | * 4/1984 | Suman, Jr. | 166/250.14 |
| 4,475,591 | * 10/1984 | Cooke, Jr. | 166/254 |
| 4,548,266 | 10/1985 | Burklund | 166/250 |
| 4,553,428 | * 11/1985 | Upchurch | 73/152 |
| 4,662,442 | * 5/1987 | Debreuille | 166/250.01 |
| 4,711,123 | * 12/1987 | Christensen | 73/151 |
| 4,733,380 | * 3/1988 | Havira | 367/35 |
| 4,775,009 | 10/1988 | Wittrisch et al. | 166/250 |
| 4,879,900 | * 11/1989 | Gilbert | 73/155 |
| 4,924,701 | * 5/1990 | Delatorre | 73/152.52 |
| 4,976,142 | 12/1990 | Perales . | |

(List continued on next page.)

FOREIGN PATENT DOCUMENTS 1582241   1/1981   (EP) .............. G01N/33/24

OTHER PUBLICATIONS

Webster's Ninth New Collegiate Dictionary, Merriam–Webster, Inc., Jan. 1991.*

(List continued on next page.)

Primary Examiner—Hezron Williams
Assistant Examiner—David J. Wiggins

(57) ABSTRACT

A distributed pressure monitoring system is disclosed for monitoring formation pressure along substantial lengths of a casing in a borehole. The monitoring system has a communications line connected to surface facilities on one end which leads down the casing on the other end. A plurality of pressure sensors are spaced along the casing, each connected in communication with the communications line. A sensor housing encloses each sensor and an open pressure tentacle is attached to the sensor housing in communication with the pressure sensor. Another aspect of the present invention is a method for simultaneously monitoring the formation pressure in multiple zones of a borehole. The formation pressure is substantially separated from overburden pressure and pressure sensors adjacent selected zones of the formation are substantially isolated by filling the borehole with a cement selected to provide less hydraulic diffusivity than that of the formation. The pressure sensors are separated axially along the borehole such that the distance between pressure sensors makes the sensors relatively insensitive to axial pressure transmission through the cement when compared to radial pressure transmission from the borehole to the pressure tentacle.

53 Claims, 6 Drawing Sheets

U.S. PATENT DOCUMENTS

| | | | |
|---|---|---|---|
| 5,142,471 | | 8/1992 | Desbrandes ........................ 364/422 |
| 5,159,569 | * | 10/1992 | Xu et al. ............................ 364/422 |
| 5,163,321 | | 11/1992 | Perales . |
| 5,181,565 | * | 1/1993 | Czernichow ......................... 166/66 |
| 5,214,384 | * | 5/1993 | Sprunt et al. ....................... 324/351 |
| 5,230,244 | * | 7/1993 | Gilbert ................................. 73/155 |
| 5,233,304 | | 8/1993 | Hubans ............................... 324/323 |
| 5,302,781 | * | 4/1994 | Hanson, III ........................ 181/102 |
| 5,303,773 | * | 4/1994 | Czernichow et al. ................ 166/66 |
| 5,318,129 | * | 6/1994 | Wittrisch ............................. 166/336 |
| 5,327,969 | * | 7/1994 | Sabins et al. ................... 166/250.14 |
| 5,348,093 | * | 9/1994 | Wood et al. .................... 166/250.14 |
| 5,353,873 | * | 10/1994 | Cooke, Jr. ............................ 166/253 |
| 5,355,951 | * | 10/1994 | Allen et al. ....................... 166/253.1 |
| 5,377,160 | * | 12/1994 | Tello et al. .................... 166/253.1 X |
| 5,467,823 | * | 11/1995 | Babour et al. ................. 166/250.01 |
| 5,473,939 | * | 12/1995 | Leder et al. ........................... 73/155 |
| 5,801,642 | * | 9/1998 | Meynier ............................ 340/856.1 |
| 5,860,483 | * | 1/1999 | Havig ............................... 166/66 X |
| 6,026,915 | * | 2/2000 | Smith et al. ........................... 175/50 |
| 6,070,662 | * | 6/2000 | Ciglenec et al. ................. 166/254.1 |

OTHER PUBLICATIONS (parent application cite) Applicants' PTO–1449 (Modified) of Mar. 27, 1997.

(parent application cite) Examiner's Form PTO–892 (Revised 9–95) of Aug. 27, 1997.

(parent application cite) Examiner's Form PTO–892 (Revised 9–95) of Jun. 2, 1998.

(parent application cite) Applicants' PTO–1449 (Modified) considered Nov. 13, 1998.

PCT/EP 97/01621 Search Report.

('205 application cites, copies of art to follow) Examiner's Form PTO–892 (Revised 9–95) of Aug. 27, 1997.

('205 application cites, copies of art to follow) Applicant's PTO–1449 (Modified) of Mar. 5, 1998.

('205 application cites, copies of art to follow) Applicant's Two Supplemental PTO–1449 (Modified) of Nov. 13, 1998.

('205 application cites, copies of art to follow) Examiner's Form PTO–892 (Revised 9–95) of Jun. 2, 1998.

('205 application cites, copies of art to follow) Applicants PTO–1449 (Modified) of Mar. 27, 1997.

R. A. Akmetov et al., "Measurements of Pressure and Temperature in Cemented Annular Space of a Well," *Burenie* (1974), No. 7, 36–39.

C. E. Cooke, Jr. et al., "Field Measurements of Annular Pressure and Temperature During Primary Cementing," *Journal of Petroleum Technology*, Aug. 1983, 1429–1438.

Definition of "frit" from *Hackh's Chemical Dictionary*, Fourth Edition, Julius Grant, Editor, Copyright 1969.

"Frits" advertisement, 3 pp. (Undated).

*Webster's Ninth New Collegiate Dictionary*, Merriam–Webster, Inc., 1983.

* cited by examiner

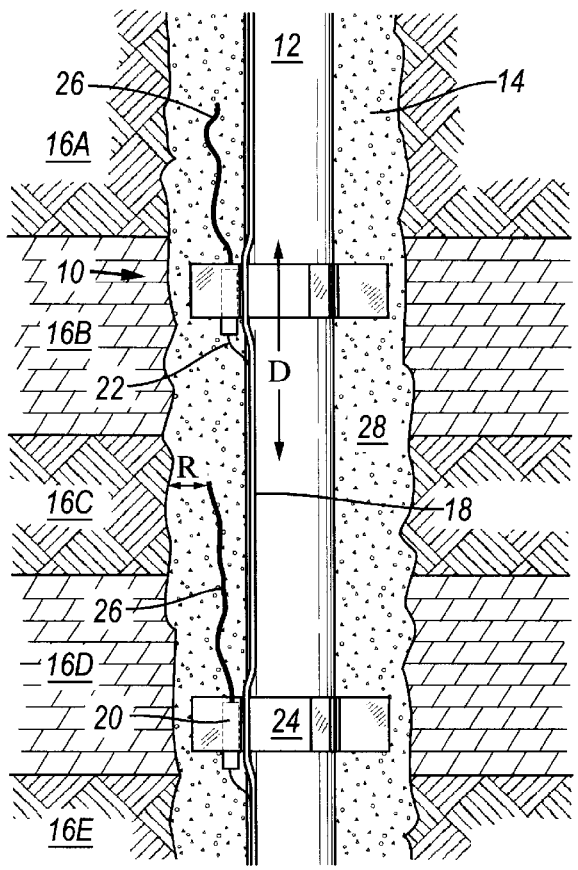
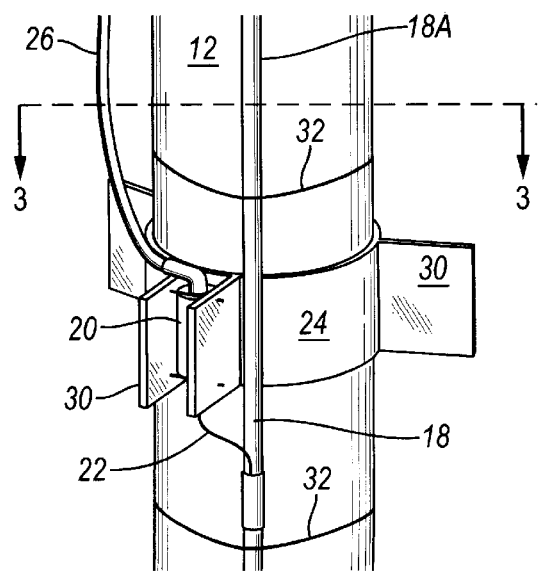
FIG. 1
FIG. 2

METHOD AND SYSTEM FOR DISTRIBUTED WELL MONITORING

This application is a continuation of Ser. No. 08/826,117 filed Mar. 27, 1997, abandoned and also claims the benefit of Provisional No. 60/014,359 filed Mar. 28, 1996.

BACKGROUND OF THE INVENTION

The present invention relates to a method and system for monitoring an underground formation intersected by a borehole. More particularly, the present invention relates to a method and system for simultaneously monitoring multiple zones of a formation along a borehole.

Current and reliable information regarding conditions at zones of a formation can aid in completing wells, reservoir management, and secondary recovery operations. In such applications a borehole is drilled through multiple zones of a formation. Some of the intersected zones may contain hydrocarbon bearing strata with reserves in recoverable form and quantity. However, other zones may also be of interest in well management.

A single downhole gauge may be placed to monitor conditions, e.g., pressure, at a given interval. This will provide current and reliable information, but only for a specific location and this may prove insufficient for well management purposes. Alternatively, commercial services provide "repeat formation testing" in which a wireline tool is run and multiple readings are taken as the tool is retrieved. This does provide data on multiple zones, but the information is not truly simultaneous and is collected only intermittently.

Thus, there remains a clear need for a method and system for providing continuous and simultaneous readings from multiple zones.

SUMMARY OF THE INVENTION

Toward providing these and other advantages, the present invention is a distributed pressure monitoring system for monitoring formation pressure along substantial lengths of a casing in a borehole. The monitoring system has a communications line connected to surface facilities on one end which leads down the casing on the other end. A plurality of pressure sensors are spaced along the casing, each connected in communication with the communications line. A sensor housing encloses each sensor and an open pressure tentacle is attached to the sensor housing in communication with the pressure sensor.

Another aspect of the preset invention is a method for simultaneously monitoring the formation pressure in multiple zones of a borehole. The formation pressure is substantially separated from overburden pressure by connecting the input of pressure transducers at selected zones to a pressure tentacle in the form of a gravel packed permeable wire mesh hose. Pressure sensors adjacent selected zones of a formation intersected by the borehole are substantially isolated by filling the borehole with a cement selected to provide less hydraulic diffusivity than that of the formation. Pressure tentacles are arranged such that, when cemented, they will come into close proximity with the borehole wall at least somewhere along the length of the pressure tentacle. The pressure sensors are separated axially along the borehole such that the distance between pressure sensors makes the sensors relatively insensitive to axial pressure transmission through the cement when compared to radial pressure transmission from the borehole to the pressure tentacle.

BRIEF DESCRIPTION OF THE DRAWINGS

The brief description above, as well as further advantages of the present invention, will be more fully appreciated by reference to the following detailed description of the preferred embodiments which should be read in conjunction with the accompanying drawings in which:

FIG. 1 is a side elevational view of a distributed pressure monitoring system in accordance with the present invention;

FIG. 2 is a perspective view of a single pressure sensor mounted to a casing;

DETAILED DESCRIPTION OF ILLUSTRATIVE EMBODIMENTS

Figure 4:
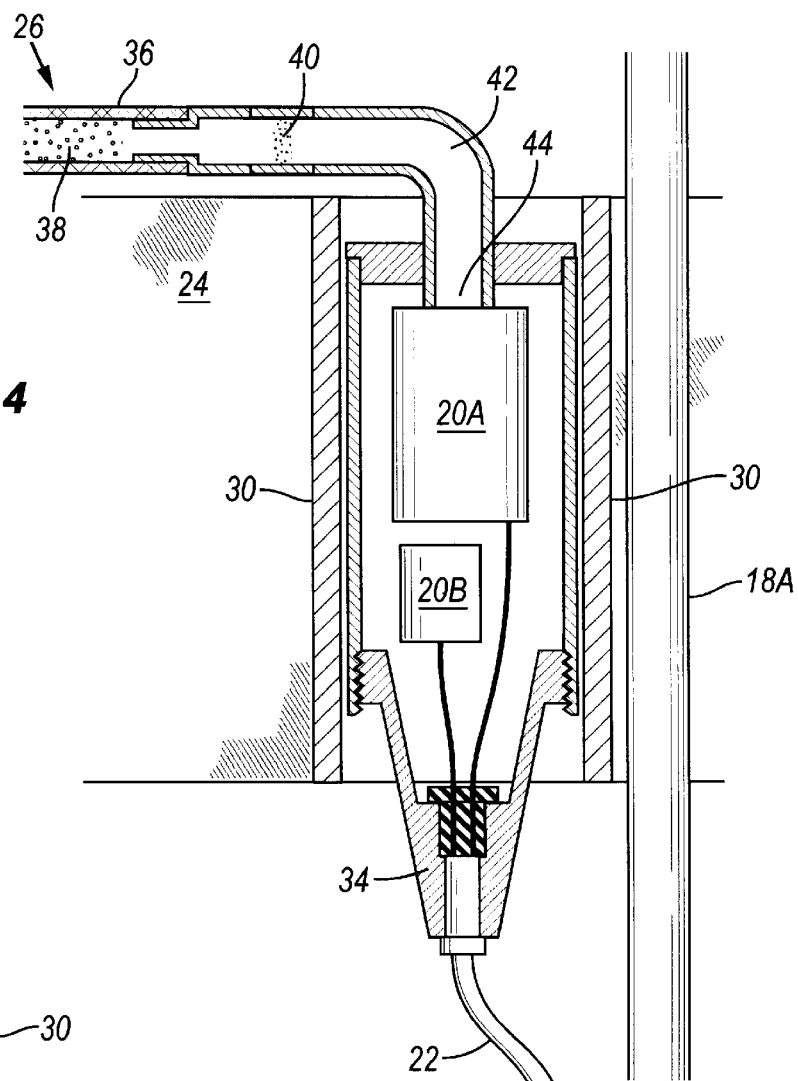
FIG. 4 is a cross sectional view of the pressure sensor of FIG. 3 taken along line 4—4 of FIG. 3.

A distributed monitoring system 10 is illustrated in FIG. 1 mounted to the exterior of casing 12. The casing is run within borehole 14 which intersects multiple zones 16A–16E in the illustrated interval. A communications line 18 runs along the casing and branches off to sensors 20 at pigtails 22. The sensors are mounted to the casing at protectolizers 24 which protect both the sensors and the communication line during installation. Sensors, here pressure sensors 20A, are provided with open pressure tentacles 26. A cement 28 fills the annulus between the borehole wall and the casing.

Figure 3:
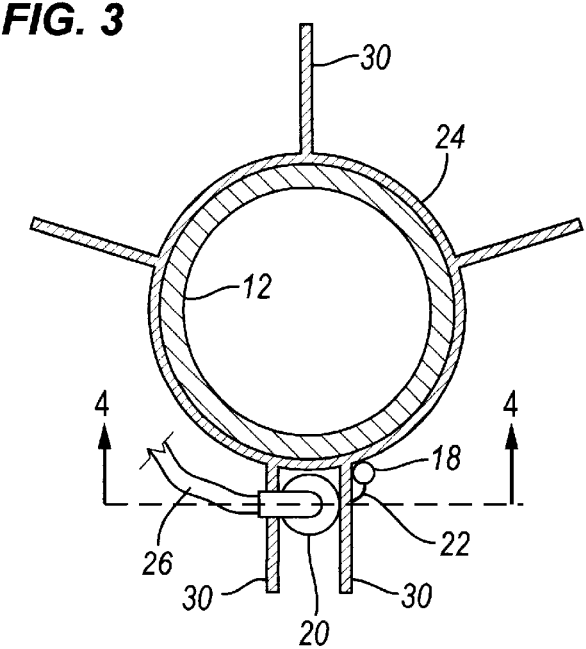
FIG. 3 is an axially cross sectioned view of the pressure sensor of FIG. 2 as taken at line 3—3 in FIG. 2.

Protectolizer 24 is a modified centralizer mounted on casing 12. FIG. 2 illustrates pressure sensor 20 mounted and pinned between adjacent vanes 30 of protectolizer 24. The communications line is attached to casing 12 with straps or ties 32 and is also protected from contact with the borehole wall when casing 12 is lowered into place. See also FIG. 3.

Communication may be provided through telemetry or through a communications line 18 as may vary in accordance with the sensor and transmission needs. Those having skill in the art will understand the present invention to have application across a wide variety of sensor needs. Potential applications include pressure, temperate, and fluid composition. If a communications line 18 is deployed, it may be a multiple wire or multiline cable bundling a plurality of discrete wires. Alternatively, a fiber optic bundle may be used. In some embodiments, communications line 18 may even be formed with a bundle of capillary tubes, e.g., to transmit pressure directly from a sensor input element in the form of an open end with a fluid interface which communicates with surface sensors through an inert fluid in the capillary tube. In other applications it may be desired to monitor fluid composition with an infra-red or IR sensor to determine the oil, gas, and water makeup of current formation fluids. However, for the purposes of illustration, an embodiment of the invention is disclosed for monitoring pressure and, optionally, temperature. These are two parameters which are traditionally of great interest in reservoir management.

In this embodiment, communications line 18 is formed by multiline cable 18A, with each pigtail 22 connecting one of the sensors to a discrete wire within the cable.

FIG. 4 is a schematic illustration cross sectioning sensor 20. Here, sensor 20 carries a pressure transducer 20A and a temperature sensor 20B within sensor housing 34. The pressure transducer and temperature sensor forward signals to the surface through pigtail 22 and multiline cable 18A. Pressure transducer 20A samples the formation pressure through open pressure tentacle 26 in the form of stainless steel wire mesh hose 36 which is packed with gravel 38. A frit 40 separates tentacle 26 from pressure transducer 20A and the frit allows formation pressure to pass and impinge upon silicone grease pack 42, and therethrough upon diaphragm 44 of pressure transducer 20A.

Figure 5:
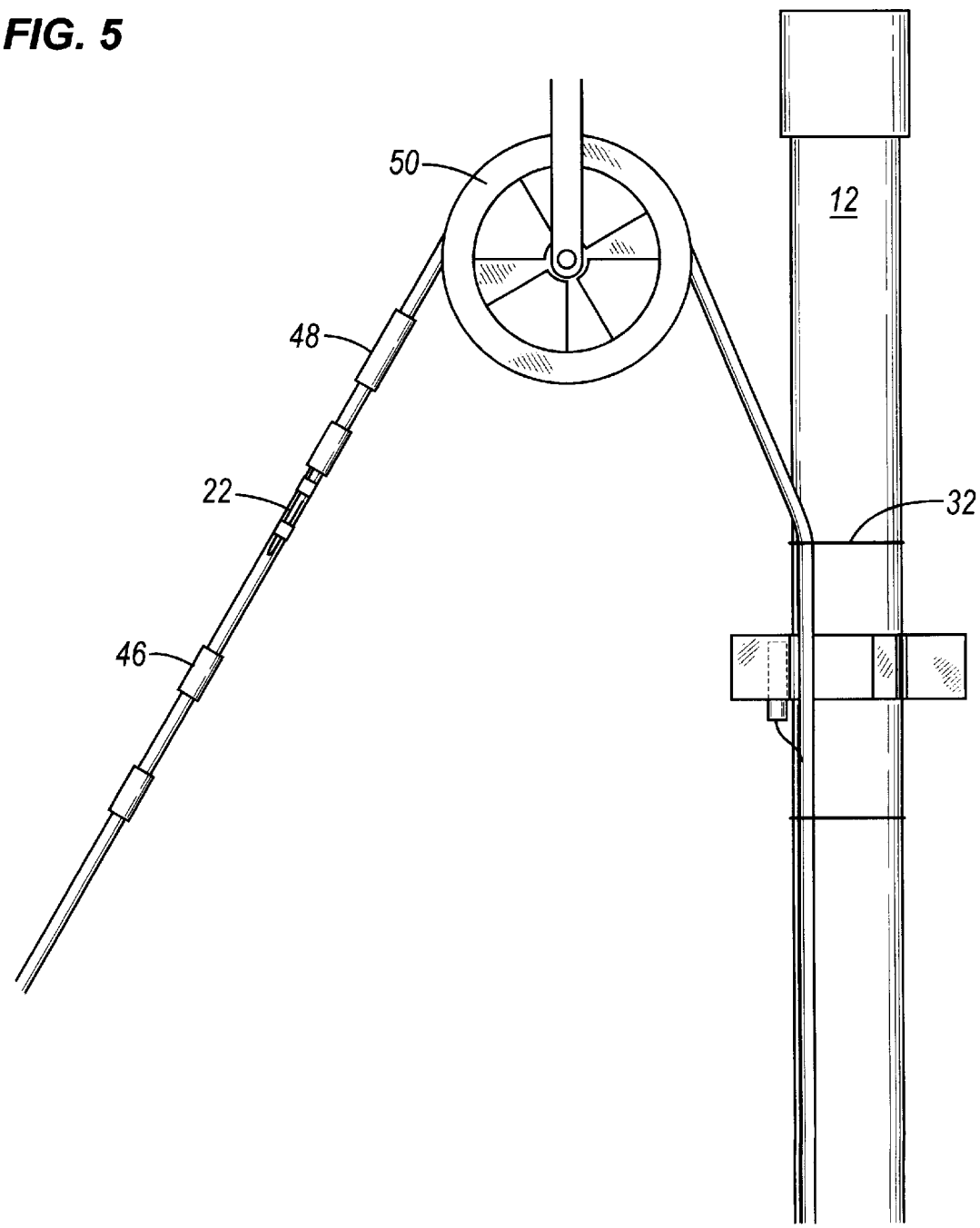
FIG. 5 is a side elevational view illustrating installation of a distributed pressure monitoring system.

FIG. 5 illustrates installation of a distributed pressure monitoring system. Multiline cable 18A arrives for installation spooled. In the illustrated embodiment, it is spooled with fluid blockers 46, pigtails 22 and repair sleeves 48 positioned to connect to sensors along the casing upon installation. The fluid blockers are lengths of pipes sealed tightly about the cable. These pipe lengths create a superior bond with the cement and prevent fluid migration between sensors 20 along communication line 18. The repair sleeves facilitate repair should the cable be damaged in handling. In that event, the breach is filled with resin and the sleeve slides into position thereover and is clamped and/or glued in place to secure the seal. The spooled cable is fed over a sheave 50 and cable 18A is tied in place about casing 12 with straps or ties 32. A sensor 20 is mounted within protectolizer 24 and is connected to cable 18A through pigtail 22 which is untaped from the spooled cable and plugged into the sensor. Another joint is made up to casing 12 and the previous casing section, with distributed pressure monitoring system 10 attached, is advanced through the slips which may be modified to best accommodate this additional equipment as the monitoring system is connected to the next length of casing, and so on.

After the casing is set, it is cemented into place. See FIG. 1. The selection of cement 28 is important in the overall design. The diffusivity of the parameter to be monitored (in this case pressure) should be less in the cement than in the formation so as not to compromise the zonal measurement of interest. However, the diffusivity should not be so small that it inhibits the measurement of interest.

Diffusivity is a parameter which characterizes the rate of transport of heat, mass or fluid-momentum. Hydraulic diffusivity, "60" characterizes the diffusion of pressure as fluid is transported through porous media. It is defined as:

$$\alpha = \frac{\text{permeability}}{\text{porosity} \times \text{viscosity} \times \text{compressibility}}$$

where, for the cement:
    permeability is the permeability of the cement;
    porosity is the porosity of the cement;
    viscosity is the viscosity of the fluid within the cement matrix with the cement; and
    compressibility is the compressibility of the system, including the cement and the fluids injected therewith.

Axial separation of sensors in adjacent zones is selected such that radial transmission from the borehole wall will greatly exceed axial transmission along the borehole between adjacent sensors. Stated differently and returning to the example of pressure measurement, the fluid and pressure transmission are a function of time, diffusivity, and distance, the relationship of which may be roughly approximated by the following equation when the radius of the well bore and the radius of the casing are of comparable size and the curvature within the cement annulus can be reasonably neglected:

$$\% \text{ pressure transmitted} = \text{erfc}\,[d/\sqrt{(\alpha t)}]$$

where:
    erfc( )=the complementary error function
    $\alpha$=diffusivity
    t=time
    d=distance of concern which pressure is transmitted through the cement Applying this basic relationship to the geometry of the borehole, a maximum distance from the formation (borehole wall) to the sensor may be expressed as follows:

$$\frac{R_{\max}^2}{\alpha t} = C_1^2$$

where:
    $R_{max}$=maximum radial distance, i.e., separation, between the sensor and the formation at the borehole wall
    $\alpha$=diffusivity of the cement
    t=time
    erfc[$C_1$]=% pressure transmitted from formation to sensor Similarly, the minimum spacing between adjacent sensors which influences pressure interference between transducers may be expressed as:

$$\frac{D_{\min}^2}{\alpha t} = C_2^2$$

where:
    $D_{min}$=minimum axial distance or separation between the pressure sensing elements of adjacent sensors
    $\alpha$=diffusivity of the cement
    t=time
    erfc[$C_2$]=% pressure transmitted across axial separation of sensors For instance, and by way of example, only at least 98% of the pressure is transmitted through the borehole to a transducer when $$\frac{R_{max}^2}{\alpha t} < C_1^2$$

where erfc[$C_1$]=0.98 and $R_{max}$ is the maximum separation between a sensor and the formation. Similarly, the pressure interference between adjacent pressure sensors is minimized to less than 2% error when $$\frac{D_{min}^2}{\alpha t} < C_2^2$$

where erf [$C_2$]=0.02, and $D_{min}$ is the minimum axial separation between the pressure sensing element of two transducers. The actual spacing and corresponding choice of acceptable errors are part of the design specification.

Because of the nonlinear nature of this relationship between distance and time, pressure can be seen to be far more readily transmitted over short distances such as between the formation and the nearest sensor than over the moderate distances which separate adjacent sensors. This allows substantial isolation of data from adjacent formation zones intersected by the borehole with corresponding pressure sensors.

The borehole is filled with cement having a hydraulic diffusivity designed to meet the aforementioned criteria. The pressure tentacles are arranged such that, when cemented, they will come into close proximity with the borehole wall ($R_{max}$) at least somewhere along the length of the pressure tentacle. The adjacent pressure sensors separated axially along the borehole such that the distance between pressure sensors ($D_{min}$) makes the sensors relatively insensitive to axial pressure transmission through the cement when compared to radial pressure transmission from the borehole to the pressure tentacle.

Cement in drilling and completion arts is commonly made up from the following components: Class G cement, Cement Friction Reducer, mixed metal hydroxides, sodium silicate, flyash, silica flour, silica sand, fumed silica, spherelite, and bentonite gel. With this range of variables and the state of present documentation of characteristics, selecting an appropriate cement for a given application may involve a testing program with respect to time, temperature, permeability and compressive strength.

Cement selection and sensor placement may be more clearly illustrated by working through an example designing a distributed pressure monitoring system for application in a given well.

Illustrative Design Example

Figure 9:
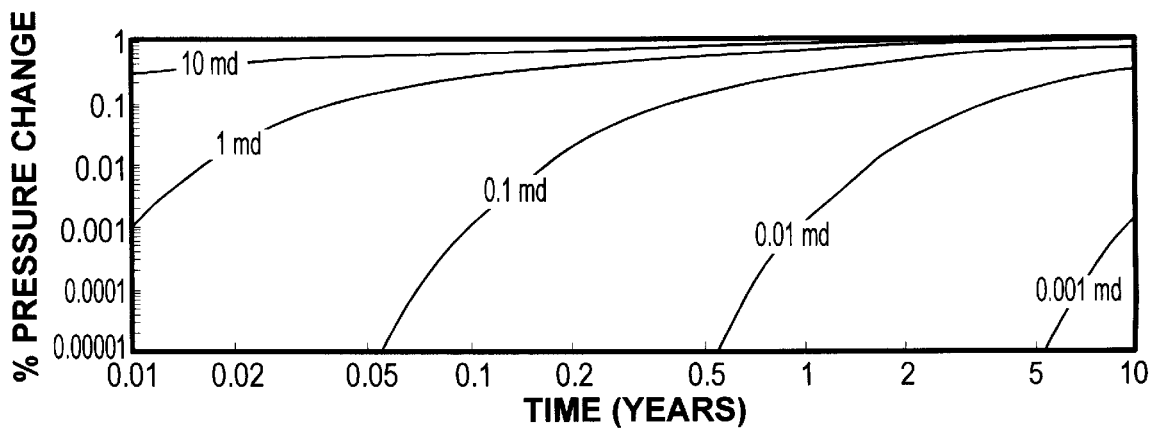
FIG. 9 is a graph illustrating pressure propagation modeled for a particular well, parametrically plotted against time, and cement permeability.
Figure 10:
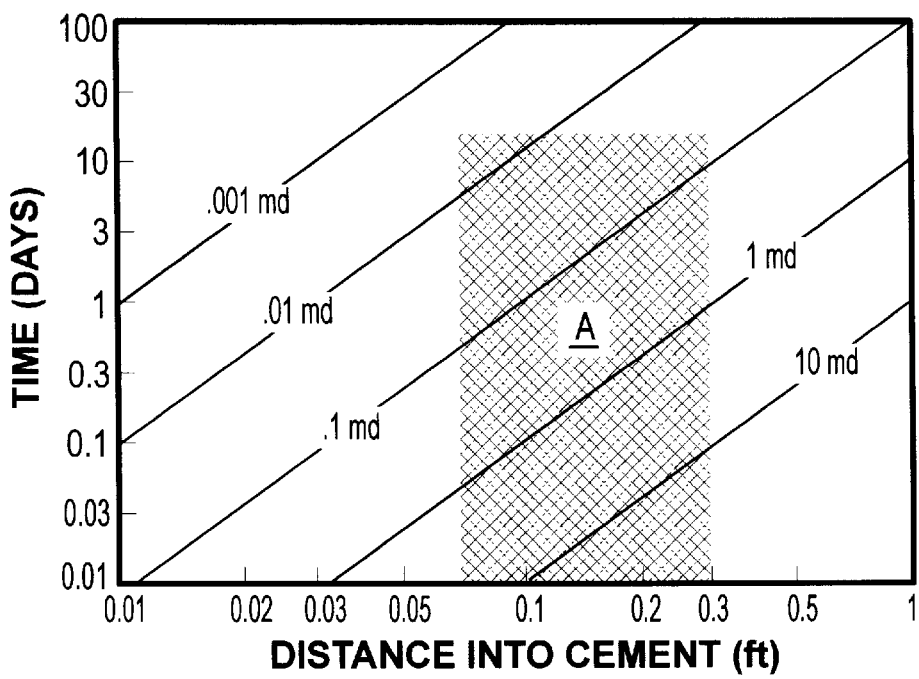
FIG. 10 is a graph illustrating results of modeling pressure response as a function of time, distance and permeability for pressure transmission from a selected zone to an adjacent sensor.
Figure 11:
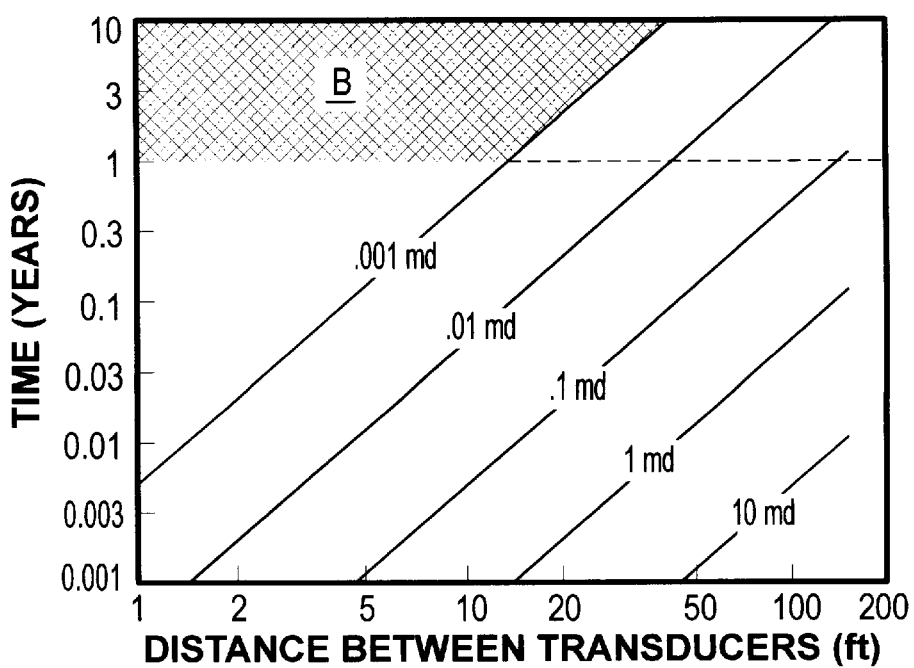
FIG. 11 is a graph illustrating results of modeling pressure response as a function of time, distance and permeability for pressure transmission through the cement between pressure sensors.

The graphs of FIGS. 9–11 illustrate design parameters as conservatively modeled for application to a given well. FIG. 9 illustrates the basic relationship of pressure migration through cement as a function of percent pressure change, time, and cement permeability (assuming that cement selection holds porosity and compressibility substantially constant). Under these constraints, FIG. 10 models a range of cement permeabilities, delay (days), and distance $R_{max}$ based on a design criteria of 98% of the formation pressure being seen at the pressure sensor. FIG. 11 then models a range of cement permeabilities, delay (years), and separation, $D_{min}$, based on a design criteria of no more than 5% of the pressure at a sensor in one zone migrating through the cement and interfering with the pressure measurement in the second zone.

The optimal spacing between sensors (D) (see FIG. 1) is determined after a cement permeability is selected. The selected permeability must allow a rapid sensor response time while minimizing the error in pressure response due to communication through the cement between sensors. In this example, cement permeability greater than 0.001 md allows a response time of less than 10 days through ½ inch of cement ($R_{max}$) and cement permeability less than 0.03 md allows sensors 50 feet apart ($D_{min}$) to remain isolated (to within 5% error) for more than one year. The cement was formulated to be 0.01 md to balance these two criteria.

The importance of the pressure tentacle as a means to control ($R_{max}$) is apparent in designing such a system, e.g., calling for mounting sensors on a 5" casing within an 11½" borehole. The pressure tentacle ensures an effective pressure conduit that is adjacent the formation and not affected by any minor, very localized variations in the cement mixture.

Figure 8:
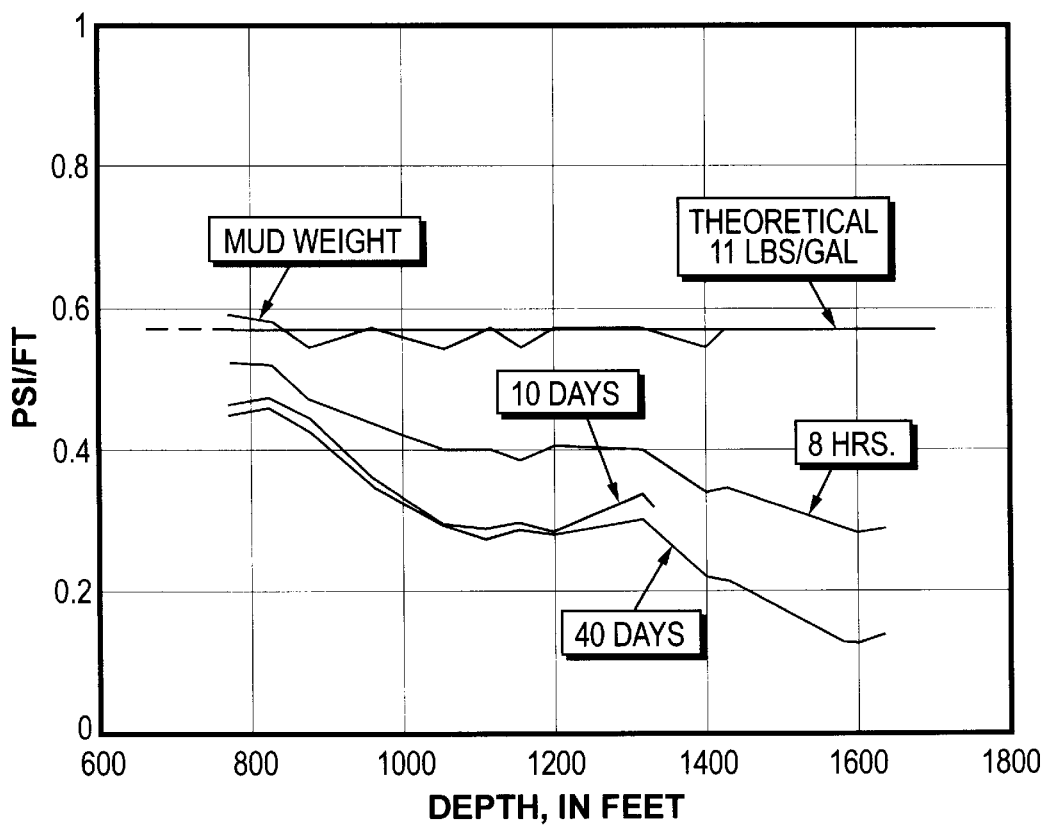
FIG. 8 is a graph illustrating pressure changes in the formation over time.

FIG. 8 illustrates the pressure gradient in a well as a function of pressure, depth, and time as is particularly useful for reservoir management. Here the pressure at selected lower zones is shown to decrease over time. Excessive pressure depletion in any zone may lead to formation compaction which can collapse the well casing and lead to well failure. The sensor array provides notice of pressure depletion and timely access to this data allows adjustments in pumping schedules and/or secondary recovery operations to protect the well and to maximize production efficiency.

Figure 6:
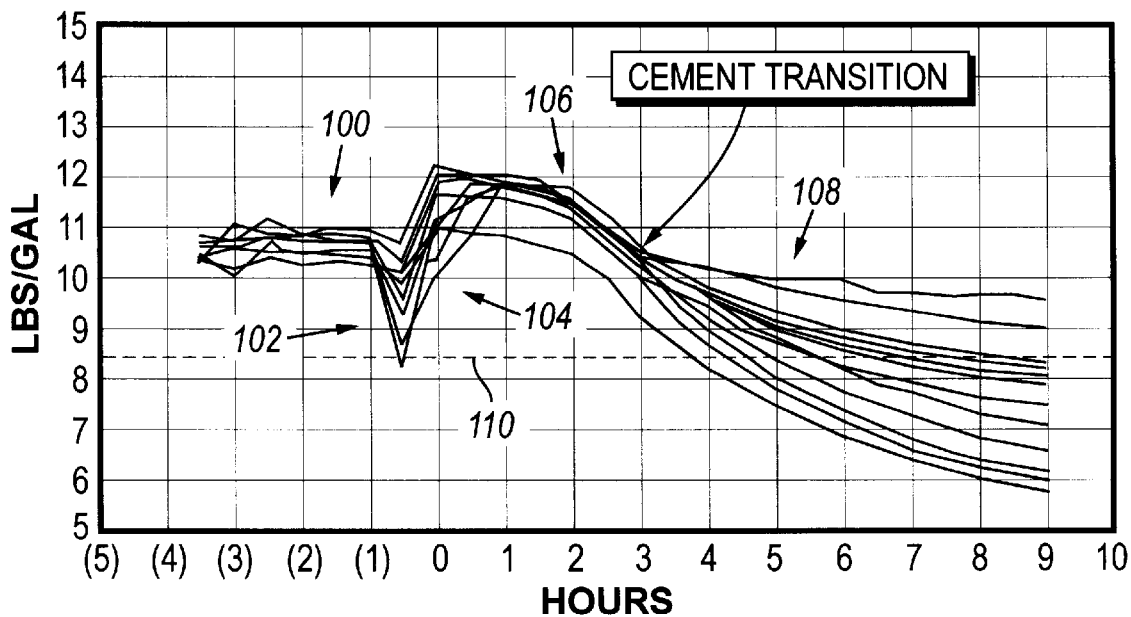
FIG. 6 is a graph illustrating data collected by monitoring multiple zones during successful cementing operations for a well.
Figure 7:
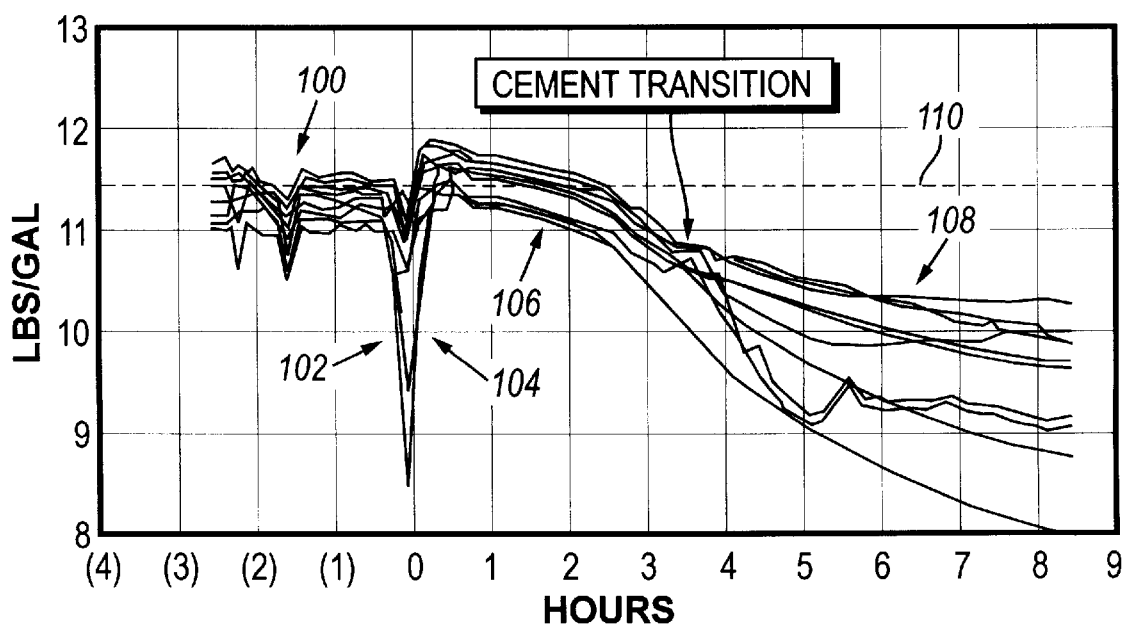
FIG. 7 is a graph illustrating data collected by monitoring multiple zones during cementing operations for a well which was predicted to require remedial actions.

FIGS. 6 and 7 illustrate a special application of distributed pressure monitoring system 10 to monitor cement jobs for secure seals against the casing. The casing is set with the distributed monitoring system in place. The mud stabilizing the formation and controlling the well has a density indicated on the graph at region 100. The mud is displaced with a water/surfactant slug which appears as a sharp drop 102 which is followed by pumping cement down the casing and up the annulus of the borehole which appears as a sharp rise in density at 104. After the column of cement is in place, it begins to set. This process begins with a cement matrix forming due to cement slurry particulates reacting, bridging and mechanically bonding to the formation. The density of the slurry column thus decreases, which translates to a decrease in fluid pressure within the cement matrix. At this juncture, the nature of the cement reaction is such that the pressure trend decreases with a negative curvature 106. When the cement bonds achieve sufficient strength, the cement matrix behaves completely like a solid. Water trapped in the cement matrix at close to hydrostatic pressure diffuses in (or out) of the formation, until it equilibrates with formation pressure. This state of pressure increase (or decrease) must trend with a positive curvature 108. The inflection point between these two regimes is, by definition, the point at the cement can handle the formation load, and is labeled "cement transition" in the FIGS. 6 and 7.

Returning to FIGS. 6 and 7, the maximum formation pressure 110 may be historically available, or may be observed after the cement sets fully and formation pressure migrates through the cement to pressure sensors. The critical difference illustrated between FIGS. 6 and 7 is that the cement transition of FIG. 6 occurs before the pressure in the cement column drops below the maximum formation pressure. That is, the cement develops structural integrity before the formation has a chance to flow in toward the cement column, disaggregating the cement matrix, and allowing fluid (gas or liquid) to flow to the surface. Contrast FIG. 7 where such failure is predicted. In this instance, expensive remedial action was required in the form of a "squeeze job" in which cement is injected into the pathway of the annular fluid (gas or liquid) flow to stop hydrocarbons from flowing to the surface trough the cemented annulus. Having contemporaneous access to this data not only predicts when remedial action will be required, but allows the design of future cementing to better meet the needs of the formation.

The foregoing description is merely illustrative of some embodiments of the present invention and many variations are set forth in the preceding discussion. Further, other modifications, changes and substitutions are intended in the foregoing disclosure and in some instances some features of the invention will be employed without a corresponding use of other features. Accordingly, it is appropriate that the appended claims be construed broadly and in the manner consistent with the spirit and scope of the invention herein.

What is claimed is:

1. A distributed pressure monitoring system for simultaneously monitoring formation pressure across multiple zones intersected by a borehole into which a casing has been cemented, said monitoring system comprising:
    a multiple wire cable connected to surface facilities on one end and strapped in place along the casing leading down through the zones to be monitored;
    a plurality of pressure sensors spaced along the casing, each connected in communication with the cable, each sensor comprising:
        a pressure transducer;
        a diaphragm in the transducer;
        a conduit leading to the diaphragm;
        a pack of silicone grease in the conduit in communication with the diaphragm;
    a sensor housing enclosing each sensor and mounted to the casing;
    a plurality of open pressure tentacles, each attached to the sensor housing and in communication with one of the pressure sensors and comprising:
        a frit connected to conduit of the pressure sensor in contact with the pack of silicone grease;
        a permeable wire mesh hose closed on one end and connected to the pressure sensor upstream of the frit; and
        a gravel pack within the permeable wire mesh hose; and
    a plurality of fluid blockers molded onto the cable between the pressure sensors.

2. A distributed monitoring system in accordance with claim 1, further comprising a plurality of protectolizers, each comprising:
    a collar securely engageable about the casing;
    a plurality of radially extending, axially oriented centralizing fins projecting from the collar;
    a pair of axially oriented plates extending from the collar so as to receive the sensor housing.

3. A distributed pressure monitoring system in accordance with claim 2, further comprising:
    a plurality of pigtails extending from the cable and connected to the pressure sensors.

4. A distributed pressure monitoring system in accordance with claim 3, further comprising a plurality of temperature sensors, each mounted within one of the sensor housings and in signal transmitting communication with the cable.

5. A distributed pressure monitoring system in accordance with claim 1 wherein the hydraulic diffusivity of the cement and the spacing of the open pressure tentacles are adjusted such that the time scale for pressure communication from the formation to the transducer is small compared with communication between adjacent transducers.

6. A method for simultaneously monitoring multiple zones in a borehole, said method comprising:
    running a distributed pressure monitoring system with a casing within a borehole, comprising:
        strapping a multi-wire cable to the casing as it is made up and lowered into the borehole;
        mounting protectolizers onto the casing at selected intervals corresponding with the zones to be monitored;
        assembling pressure sensors within sensor housings;
        connecting the pressure sensors to the cable and mounting the sensor housings within the protectolizers;
        installing open pressure tentacles having a wire mesh hose packed with gravel onto the sensor housing while providing fluid pressure transmission to the pressure sensor through a frit and a silicone grease packed conduit; and
    cementing the casing and attached distributed pressure monitoring system within the borehole with a cement selected to provide less hydraulic diffusivity than that of the formation.

7. A method for simultaneously monitoring the formation pressure in multiple zones of a borehole, comprising:
    substantially separating formation pressure from overburden pressure by connecting the input of pressure transducers at selected zones to a pressure tentacle in the form of a gravel packed wire mesh hose;
    substantially isolating zones of a formation intersected by the borehole and adjacent pressure sensors, comprising:
        filling the borehole with a cement selected to provide less hydraulic diffusivity than that of the formation;
        arranging the pressure tentacles such that, when cemented, they will come into close proximity with the borehole wall at least somewhere along the length of the pressure tentacle;
        separating the pressure sensors axially along the borehole such that the distance between pressure sensors makes the sensors relatively insensitive to axial pressure transmission through the cement when compared to radial pressure transmission from the borehole to the pressure tentacle.

8. A method for simultaneously monitoring the formation conditions in multiple selected zones of a borehole, comprising:
    placing a plurality of sensory input elements adjacent selected zones in the borehole;
    substantially isolating the selected zones of a formation intersected by the borehole and adjacent sensory input elements, comprising:
        filling the borehole with a cement selected to provide less diffusivity as to the condition monitored than that of the formation;
        arranging the sensory input elements such that, when cemented, they will come into relatively rapid communication with conditions at the borehole wall; and
        separating the sensory input elements axially along the borehole such that the axial distance between sensory input elements makes the measurement of the monitored condition relatively insensitive to axial transmission through the cement when compared to radial transmission from the borehole to the sensory input element.

9. A method for simultaneously monitoring the formation conditions in multiple selected zones of a borehole in accordance with claim 8, wherein placing a plurality of sensory input elements adjacent selected zones in the borehole comprises:

attaching a multiple wire cable to a casing set in an interval of the borehole intersecting the selected zones;

providing a plurality pigtail connections to the multiple wire cable;

attaching a plurality of sensor onto the casing in communication with the multiwire cable through the pigtails, the sensors being located on the casing so as to correspond with selected zones when the casing is set.

10. A method for simultaneously monitoring the formation conditions in multiple selected zones of a borehole in accordance with claim 9, wherein arranging the sensory input elements such that, when cemented, they will come into relatively rapid communication with the conditions at the borehole wall comprises:

providing the sensory input elements as sensor tentacles in the form of gravel packed permeable wire mesh hoses in pressure transmitting communication with pressure transducers; and arranging the sensor tentacles such that, when cemented, they will come into close proximity with the borehole wall at least somewhere along the lengths of the sensor tentacle.

11. A distributed pressure monitoring system for monitoring formation pressure along a substantial lengths of a casing in a borehole, said monitoring system comprising:

a communications line connected to surface facilities on one end and leading down the casing;

a plurality of pressure sensors spaced along the casing, each connected in communication with the communications line;

a sensor housing enclosing each sensor; and a plurality of open pressure tentacles, each attached to the sensor housing and in communication with one of the pressure sensors and open pressure tentacle comprising:

a frit connected to the pressure sensor;

a wire mesh hose closed on one end and connected to the pressure sensor upstream of the frit; and a gravel pack within the wire mesh hose.

12. A distributed pressure monitoring system in accordance with claim 11, wherein the sensor housings are mounted to the casing.

13. A distributed pressure monitoring system in accordance with claim 12, further comprising a plurality of protectolizers, each comprising:

a collar securely engageable about the casing;

a plurality of radially extending, axially oriented centralizing fins projecting from the collar;

a pair of axially oriented plates extending from the collar so as to receive the sensor housing.

14. A distributed pressure monitoring system in accordance with claim 13, further comprising:

a plurality of pigtails extending from the communication line, each connected to one of the sensors.

15. A distributed pressure monitoring system in accordance with claim 13, where the pressure sensor further comprises:

a pressure transducer;

a diaphragm within the pressure transducer;

a conduit between the frit and the diaphragm; and silicone grease packed in the conduit between the frit and the diaphragm.

16. A distributed pressure monitoring system in accordance with claim 15, further comprising a plurality of temperature sensors, each mounted within one of the sensor housings and in communication with the communication line.

17. A method for simultaneously monitoring the formation conditions in multiple selected zones of a borehole, comprising:

placing a plurality of sensory input elements adjacent selected zones in the borehole, comprising;

attaching a multiple wire cable to a casing set in an interval of the borehole intersecting the selected zones;

providing a plurality pigtail connections to the multiple wire cable;

attaching a plurality of sensor onto the casing in communication with the multiwire cable through the pigtails, the sensors being located on the casing so as to correspond with selected zones when the casing is set;

substantially isolating the selected zones of a formation intersected by the borehole and adjacent sensory input elements, comprising:

filling the borehole with a cement selected to provide less diffusivity as to the condition monitored than that of the formation;

arranging the sensory input elements such that, when cemented, they will come into relatively rapid communication with conditions at the borehole wall, comprising:

providing the sensory input elements as sensor tentacles in the form of gravel packed permeable wire mesh hoses in pressure transmitting communication with pressure transducers; and arranging the sensor tentacles such that, when cemented, they will come into close proximity with the borehole wall at least somewhere along the lengths of the sensor tentacle; and separating the sensory input elements axially along the borehole such that the axial distance between sensory input elements makes the measurement of the monitored condition relatively insensitive to axial transmission through the cement when compared to radial transmission from the borehole to the sensory input element.

18. A system for monitoring a characteristic which transfers through an earth formation, the system comprising:

a borehole formed into the earth formation;

a casing set within the borehole;

a layer of cement securing the casing within the borehole, the characteristic being transferable through at least part of the thickness of the cement layer or bore hole skin as a function of diffusivity;

at least one sensor for measuring said characteristic, each sensor being attached to the casing and including sensing means extending into the layer of cement; and a signal communication means for transferring signals representing said characteristic from the sensor to a selected surface facility.

19. A system for monitoring a characteristic in accordance with claim 18, wherein said characteristic is at least one of the formation pressure, the formation temperature and the formation fluid composition.

20. A system for monitoring a characteristic in accordance claim 18, comprising a plurality of said sensors spaced along the casing.

21. A system for monitoring a characteristic in accordance with claim 18, wherein said signal communication means for transferring signals comprises a communications line extending along the casing to said surface facility, each sensor being connected in communication with the communications line.

22. A system for monitoring a characteristic in accordance with claim 21, wherein each sensor is connected in communication with the communications line by means of a pigtail.

23. A system for monitoring a characteristic in accordance with claim 22, wherein each sensor is enclosed by a sensor housing.

24. A system for monitoring a characteristic in accordance with claim 23, wherein each sensor is protected by a protector, each protector comprising a collar securely engaged about the casing and a pair of axially oriented plates extending from the collar so as to receive the sensor housing pertaining to the sensor.

25. A system for monitoring a characteristic in accordance with claim 24, wherein the protector further comprises a plurality of radially extending, substantially axially oriented centralizing fins projecting from the collar.

26. A system for monitoring a characteristic in accordance claim 18, wherein said at least one sensor includes a pressure sensor for measuring the formation pressure.

27. A system for monitoring a characteristic in accordance with claim 26, wherein each pressure sensor comprises a pressure transducer including a diaphragm, a conduit leading to the diaphragm and a pack of silicone grease in the conduit in communication with the diaphragm.

28. A system for monitoring a characteristic in accordance with claim 27, wherein the sensing means of the pressure sensor comprises an open pressure tentacle including a permeable wire mesh hose which is at one end thereof closed and at the other end thereof connected to said conduit, a gravel pack located within the wire mesh hose, and a frit located in the conduit between the pack of silicone grease and the gravel pack.

29. A system for monitoring a characteristic in accordance with claim 26, comprising a plurality of said pressure sensors spaced along the casing, wherein the sensing means of the plurality of sensors are separated by a distance along the borehole such that the sensors are relatively insensitive to axial pressure transmission through the cement when compared to radial pressure transmission from the wellbore to the sensing means.

30. A system for monitoring a characteristic in accordance with claim 29, wherein the hydraulic diffusivity of the cement and the spacing of the sensing means are adjusted such that the time scale for pressure communication from the formation to the sensing means is small compared with communication between adjacent sensing means.

31. A system for monitoring a characteristic in accordance with claim 30, wherein the hydraulic diffusivity of the cement is less than that of the formation.

32. A system for monitoring a characteristic in accordance with claim 18, wherein said at least one sensor includes a temperature sensor for measuring the formation temperature.

33. A method of monitoring a characteristic which transfers through an earth formation, the method comprising:
    a) attaching at least one sensor for measuring said characteristic to a casing which is to be installed in a borehole formed in the earth formation, the sensing means being arranged such as to extend between the casing and the borehole wall when the casing is installed in the borehole;
    b) providing means for transferring signals representing said characteristic from the sensor to a selected surface facility;
    c) lowering the casing into the borehole;
    d) selecting a cement for cementing the casing in the borehole so that said characteristic is transferable through at least part of the thickness of the cement layer formed when the casing is cemented in the borehole;
    e) cementing the casing in the borehole whereby the sensor becomes located in the cement layer between the casing and the borehole wall.

34. A method in accordance with claim 33, wherein step b) includes strapping a multi-wire cable to the casing as the casing is made up and lowered into the borehole.

35. A method in accordance with claim 33, wherein step a) comprises attaching a plurality of said sensors at spaced intervals along the casing, the locations of the sensors corresponding to a plurality of zones of the earth formation to be monitored.

36. A system for monitoring a characteristic which transfers through an earth formation, the system comprising:
    a borehole formed into the earth formation;
    a casing set within the borehole;
    a layer of cement securing the casing within the borehole, the cement being selected to provide much less axial diffusion for the monitored condition than that of the earth formation;
    at least one sensor for measuring said characteristic, each sensor being attached to the casing and
    a signal communication means for transferring signals representing said characteristic from the sensor to a selected surface facility.

37. A system for monitoring a characteristic in accordance with claim 36, wherein said characteristic is at least one of the formation pressure, the formation temperature and the formation fluid composition.

38. A system for monitoring a characteristic in accordance claim 37, comprising a plurality of said sensors spaced along the casing.

39. A system for monitoring a characteristic in accordance with claim 38, wherein said signal communication means for transferring signals comprises a communications line extending along the casing to said surface facility, each sensor being connected in communication with the communications line.

40. A system for monitoring a characteristic in accordance with claim 39, wherein each sensor is connected in communication with the communications line by means of a pigtail.

41. A system for monitoring a characteristic in accordance with claim 40, wherein each sensor is enclosed by a sensor housing.

42. A system for monitoring a characteristic in accordance with claim 41, wherein each sensor is protected by a protector, each protector comprising a collar securely engaged about the casing and a pair of axially oriented plates extending from the collar so as to receive the sensor housing pertaining to the sensor.

43. A system for monitoring a characteristic in accordance with claim 42, wherein the protector further comprises a plurality of radially extending, substantially axially oriented centralizing fins projecting from the collar.

44. A system for monitoring a characteristic in accordance claim 43, wherein said at least one sensor includes a pressure sensor for measuring the formation pressure.

45. A system for monitoring a characteristic in accordance with claim 44, wherein each pressure sensor comprises a pressure transducer including a diaphragm, a conduit leading to the diaphragm and a pack of silicone grease in the conduit in communication with the diaphragm.

46. A system for monitoring a characteristic in accordance with claim 45, wherein the sensing means of the pressure sensor comprises an open pressure tentacle including a permeable wire mesh hose which is at one end thereof closed at the other end thereof connected to said conduit, a gravel pack located within the wire mesh hose, and a frit located in the conduit between the pack of silicone grease and the gravel pack.

47. A system for monitoring a characteristic in accordance with claim 46, comprising a plurality of said pressure sensors spaced along the casing, wherein the sensing means of the plurality of sensors are separated by a distance along the borehole such that the sensors are relatively insensitive to axial pressure transmission through the cement when compared to radial pressure transmission from the wellbore to the sensing means.

48. A system for monitoring a characteristic in accordance with claim 47, wherein the hydraulic diffusivity of the cement and the spacing of the sensing means are adjusted such that the time scale for pressure communication from the formation to the sensing means is small compared with communication between adjacent sensing means.

49. A system for monitoring a characteristic in accordance with any one of claims 48, wherein said at least one sensor includes a temperature sensor for measuring the formation temperature.

50. A system for monitoring a characteristic in accordance with claim 36, wherein said at least one sensor includes a temperature sensor for measuring the formation temperature.

51. A system for monitoring a characteristic which advances in an earth formation the system comprising:
 a casing fixed in a well bore by layer of cement between the casing and a well bore wall;
 a plurality of sensory input elements for measuring said characteristic, each sensory input element being attached to the casing and including a sensory input element extending into the layer of cement;
 separating the sensory input elements axially along the bore hole such that the axial distance between sensory elements makes the measurement of the monitored characteristic relatively insensitive to axial transmission through the cement when compared to radial transmission from the bore hole to the sensory input element.

52. A method for simultaneously monitoring the formation conditions in multiple selected zones of a borehole, comprising:
 placing a plurality of temperature sensors adjacent selected zones in the borehole;
 substantially isolating the selected zones of a formation intersected by the borehole and adjacent temperature sensors, comprising:
  filling the borehole with a cement selected to provide less diffusivity as to the condition monitored than that of the formation;
  arranging the temperature sensors such that, when cemented, they will come into relatively rapid communication with conditions at the borehole wall; and
  separating the temperature sensors axially along the borehole such that the axial distance between temperature sensors makes the measurement of the monitored condition relatively insensitive to axial transmission through the cement when compared to radial transmission from the borehole to the sensory input element.

53. A method for simultaneously monitoring the formation pressure conditions in multiple selected zones of a borehole, comprising:
 placing a plurality of pressure sensors adjacent selected zones in the borehole; substantially isolating the selected zones of a formation intersected by the borehole and adjacent pressure sensors, comprising:
  filling the borehole with a cement selected to provide less axial diffusivity as to pressure than that of the formation;
  arranging the pressure sensors such that, when cemented, they will come into relatively rapid communication with conditions at the borehole wall; and
  separating the pressure sensors axially along the borehole such that the axial distance between pressure sensors makes the measurement of the monitored condition relatively insensitive to axial transmission through the cement when compared to radial transmission from the borehole to the pressure sensor.

* * * * *